United States Patent [19]

Fosdick

[11] 3,736,641
[45] June 5, 1973

[54] TUBULAR FILTER AND METHOD OF MAKING THE SAME

[75] Inventor: Dale P. Fosdick, Ann Arbor, Mich.

[73] Assignee: Pittsfield Products, Inc., Ann Arbor, Mich.

[22] Filed: Mar. 23, 1972

[21] Appl. No.: 237,503

Related U.S. Application Data

[63] Continuation of Ser. No. 96,950, Dec. 10, 1970, abandoned.

[52] U.S. Cl. ..............................29/163.5 F, 210/494
[51] Int. Cl. .............................................B23p 15/16
[58] Field of Search...................210/489, 323, 494, 210/497.1; 29/163.5 F, 477.3; 138/178

[56] References Cited

UNITED STATES PATENTS 2,031,138 2/1936 Taylor..............................29/477.3
3,042,216 7/1962 Goldman..............................210/494

FOREIGN PATENTS OR APPLICATIONS 1,071,638 12/1959 Germany..........................29/163.5 F Primary Examiner—Samih N. Zaharna
Assistant Examiner—F. F. Calvetti
Attorney—Barnes, Kisselle, Raisch & Choate

[57] ABSTRACT

A tubular reinforced filter comprising overlying strips of screen and perforated reinforcement helically wound and having adjacent windings bonded together, and the method of making the same comprising helically winding overlying strips of screen and perforated reinforcement and bonding adjacent windings together.

2 Claims, 7 Drawing Figures

PATENTED JUN 5 1973

FIG. 4 AFTER WELDING

INVENTOR.
DALE P. FOSDICK
BY
Barnes, Kisselle, Raisch & Choate
ATTORNEYS

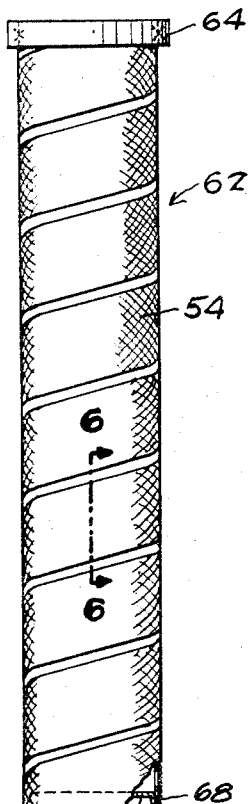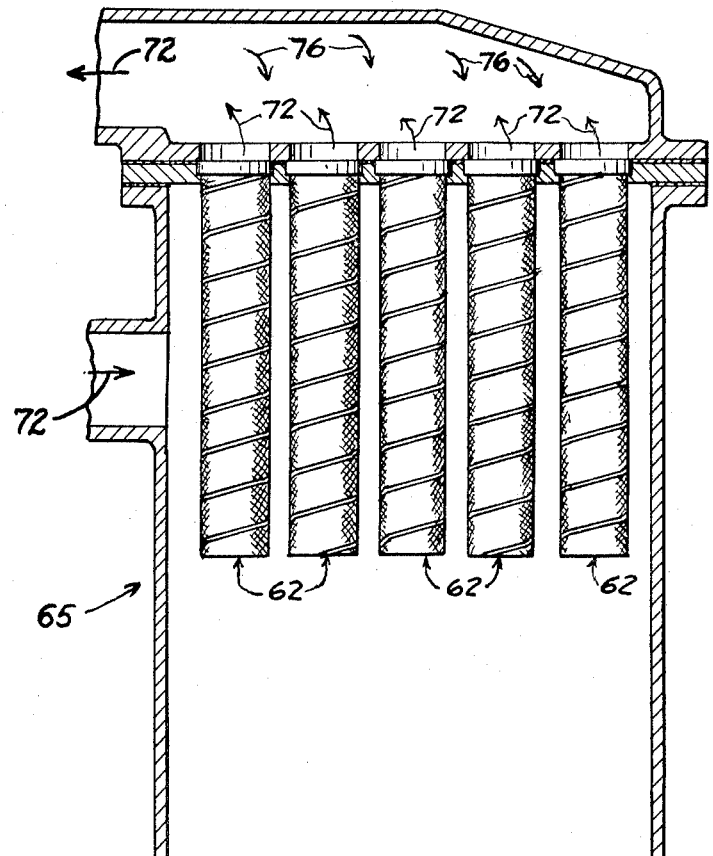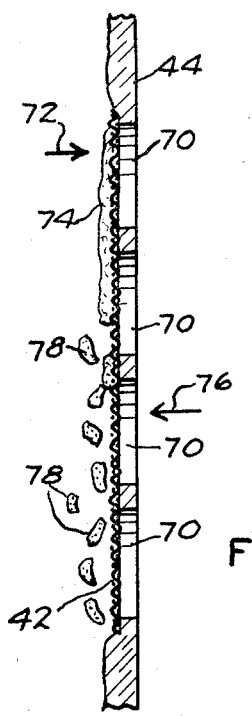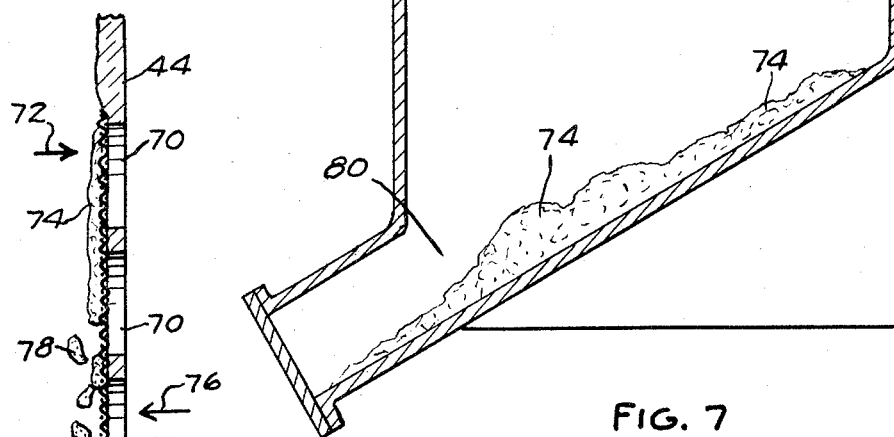
FIG. 5
FIG. 6
FIG. 7
INVENTOR.
DALE P. FOSDICK
BY
Barnes, Kisselle, Raisch & Choate
ATTORNEYS

TUBULAR FILTER AND METHOD OF MAKING THE SAME

This is a continuation of application Ser. No. 96,950 filed Dec. 10, 1970, now abandoned.

This invention relates to tubular filters and a method of making the same and is particularly concerned with tubular reinforced filters for separating suspended particles from a fluid.

In the past, tubular reinforced filters have been fabricated by inserting a perforated tubular reinforcement within a fine-mesh tubular screen, the corresponding axially opposite ends of the reinforcement and the screen being secured together to complete the assembly. This particular construction necessitates a tubular screen having a diameter at least slightly greater than the diameter of the reinforcement. When installed in a filtration apparatus the filter is normally arranged so that the fluid to be filtered is directed from outside to inside the filter with the suspended particles caking on the outside thereof. The accumulation of these particles greatly reduces the filtering capacity of the filter and a back-washing operation is required to remove them. During back-washing, fluid is forced from inside the tube to thereby break up and flush away the accumulation of particles from the outer surface of the filter, the particles usually falling into a sludge pit within the filtration device. Since a very large pressure is often required to break up the accumulation of caked particles on the screen, the screen, being unsupported except at the ends of the tube, often balloons causing the mesh size to be intolerably increased. As a consequence, the percentage of suspended material removed decreases and replacement of the filter is usually indicated.

It is therefore the principal object of this invention to provide an improved tubular reinforced filter in which the mesh of the filtering screen is unaffected by backwashing pressures required to remove accumulated particles from the screen.

It is also an object of this invention to provide a tubular reinforced filter which may be economically constructed.

Another object of this invention is the provision of a tubular reinforced filter which securely supports the filtering screen on the reinforcing member.

Another important object of this invention is to provide an improved method for constructing a tubular reinforced filter.

Yet another object of this invention is the provision of a method for constructing an improved tubular reinforced filter wherein the filter is formed by helically winding overlying strips of screen and reinforcement and progressively bonding each successive winding to the previous winding.

In the drawings:

FIG. 4 is an enlarged sectional view taken along line 4—4 in FIG. 1.

FIG. 5 is a side elevational view of a tubular reinforced filter assembly made in accordance with the present invention.

FIG. 6 is an enlarged sectional view taken along line 6—6 in FIG. 5.

FIG. 7 is a sectional view of a filtration device which embodies the tubular reinforced filter of the present invention.

Figure 1:
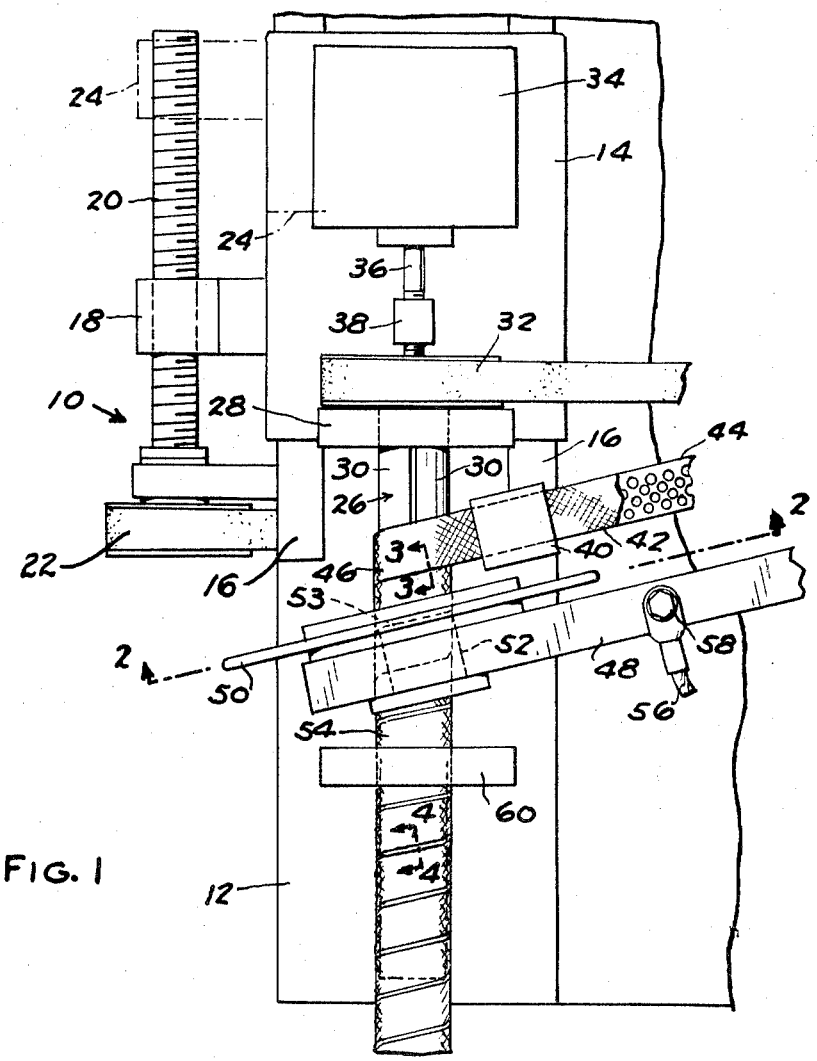
FIG. 1 is an apparatus for practicing the method of construction of a tubular reinforced filter according to the present invention.

Referring to FIG. 1, an apparatus 10 for constructing a rigid tubular reinforced filter comprises a base 12 on which a carriage 14 is guided by means of guides 16. The drive arrangement for carriage 14 comprises a nut 18 on the side of carriage 14 which is axially driven by means of an axially extending lead screw 20. One end of screw 20 is driven by a belt and pulley arrangement 22 which in turn is operatively connected to an electric motor (not shown). Carriage 14 is axially movable between a forward position as indicated by the solid lines in FIG. 1 and a return position as indicated by the broken lines 24 in FIG. 1.

An axially-extending rotatable mandrel 26 is mounted on the top surface of carriage 14 by means of a bracket 28. Mandrel 26 comprises a plurality of fingers 30 which are radially shiftable for increasing and decreasing the diameter of the mandrel thereby expanding and contracting the mandrel. Mandrel 26 is rotated by means of a belt and pulley arrangement 32 which is in turn connected to an electric motor (not shown).

Also arranged on carriage 14 is a power cylinder 34 having a piston rod 36 coaxial with mandrel 26. Rod 36 is coupled as at 38 to the usual cam arrangement for expanding and contracting the mandrel. A stock guide 40 is situated on base 12 adjacent mandrel 26. Overlying unconnected strips of a fine mesh filter screen 42 and a perforated reinforcement 44 are threaded through guide 40 and then wound on mandrel 26 to form a helical coil 46. Strips 42 and 44 may be supplied by separate reels and arranged in overlying relation as they are directed through guide 40. An arm 48, structurally supported on but electrically insulated from base 12, is spaced above mandrel 26 and carries a rotatable seam welding wheel 50 as at 52.

Figure 2:
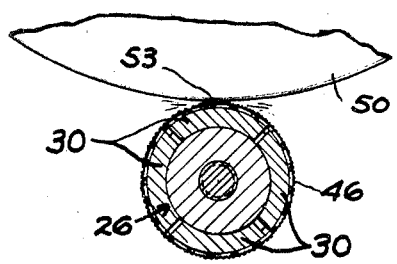
FIG. 2 is a slightly enlarged portion of a sectional view taken along line 2—2 in FIG. 1.

As better shown in FIG. 2, the portion of the circumferential edge of wheel 50 closest to mandrel 26 interengages the seam 53 of helical coil 46 with mandrel 26 for bonding the adjacent edges of successive windings to thereby form a tubular reinforced filter 54. An electric cable 56 attached to arm 48 as at 58 conducts the welding current to wheel 50 with fingers 30 of mandrel 26 forming a back-up electrode. A vertical member 60 on base 12 guides the axial movement of mandrel 26 and forms a bearing support for the end of mandrel 26 axially opposite support 28.

The apparatus described forms rigid tubular filter 54 from strips of screen 42 and reinforcement 44 of substantially equal widths by means of the following steps:

1. arranging the strips in closely conforming overlying relationship;

2. helically winding the overlying strips by rotating mandrel 26 while advancing it axially so that an edge of each successive winding overlaps the opposite edge of the previous winding; and 3. bonding the overlapped edges of successive windings together to thereby form the tubular reinforced filter.

Figure 3:
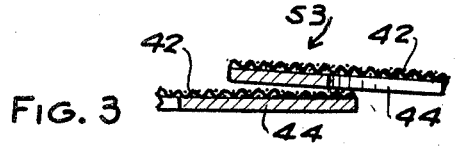
FIG. 3 is an enlarged sectional view taken along line 3—3 in FIG. 1.

In the preferred embodiment both screen 42 and reinforcement 44 are made of steel and the adjacent edge portions of successive windings are slightly overlapped before being seam welded by wheel 50. FIGS. 3 and 4 show the overlapped edge portions of successive windings before welding and after welding respectively. The seam welding operation provides a continuous weld along helical seam 53 so that there is no possibility of unwanted particles entering through seam 53.

The above described method is accomplished by the operating sequence of apparatus 10 which is now described.

With carriage 14 in the return position as indicated at 24, strips of screen 42 and reinforcement 44 are arranged in closely conforming overlying relationship and threaded through stock guide 40. The ends of the strips are initially inserted between fingers 30 of mandrel 26 so that the winding operation may be started, mandrel 26 being in the expanded position. The rotational speed of mandrel 26 is synchronized with the translational speed of carriage 14 to provide the proper lead for helically winding the strips. Sufficient back-tension is applied to strips 42 and 44 so that they are tightly wound on mandrel 26. After accumulating several windings on mandrel 26, wheel 50 is positioned to engage the overlapped portions of the windings for seam welding them together and forming filter 54. This operation is continued until carriage 14 reaches the forward position.

When carriage 14 reaches the forward position the mandrel rotation and the welding cease so that carriage 14 may be retracted to the return position. Before carriage 14 is returned mandrel 26 is contracted by actuating piston rod 36 so that it is free to pass through filter 54.

With carriage 14 in the return position mandrel 26 is expanded to regrip the portion of filter 54 between guide 40 and member 60. The welding and the winding operations are next reinitiated to continue the tube forming process. This cycle is repetitive to provide a continuous length of tubular filter 54 which may be subsequently cut to whatever length is desired. This method of forming a tubular reinforced filter is economically advantageous and may be readily adapted to provide tubes of varying lengths and diameters.

FIG. 5 shows a completed filter assembly 62 made in accordance with the present invention. A ring 64 is provided at the open end of filter 54 so that filter assembly 62 may be readily installed in a filtration device 65 such as that shown in FIG. 7. The other end of filter 54 is closed by an end cap 66 circumferentially welded to filter 54 as at 68.

FIG. 6 shows an enlarged sectional view of filter 54. The thickness of reinforcement 44 is substantially greater than that of screen 42 to provide excellent rigidity. The perforations 70 in reinforcement 44 are closely spaced and made very much larger than the mesh size of screen 42, so that reinforcement 44 does not impair the effectiveness of the filtration process. By way of example, screen 42 may have a 100 mesh while the circular perforations in reinforcement 44 may have a diameter of about 5/32 in. Perforations 70 are spaced inwardly of the side edges of strip 44 so that the edges of the latter are imperforate.

Referring to FIGS. 6 and 7, arrows 72 show the direction of fluid flow during the filtration process within device 65. This flow pattern causes particles suspended in the fluid to accumulate on screen 42 as at 74. Arrows 76 show the direction of fluid flow during the back-washing operation. This flow pattern causes the accumulated particles 74 to be removed from the filter as at 78 and then deposited in a sludge pit 80 for subsequent removal. Because screen 42 is securely attached to reinforcement 44 throughout the length of filter 54 by helical seam welding, screen 40 is not deformed by the back-washing operation, and the useful life of the filter is greatly prolonged.

I claim:

1. The method of forming a reinforced tubular element for a filter from a first strip of fine mesh metal screen and a second strip of perforated metal reinforcement having a width substantially equal to the width of the first strip which comprises, arranging the two strips in linear overlying relation with the opposite marginal side edges of one of said strips superimposed on and aligned laterally with the opposite marginal side edges of the other of said strips, advancing said two strips through a fixed guide means for maintaining the marginal side edges of the two strips in said overlying aligned relationship, causing said guide means to direct said two strips in said overlying relation onto a rotating, electrically conductive, cylindrical mandrel at an oblique angle to the axis of rotation of the mandrel, simultaneously moving the mandrel axially relative to the guide means in a direction parallel to the axis of rotation of the mandrel while the strips are being fed thereon through said guide means so that the linearly superimposed strips are helically wound on the mandrel to progressively form a tube thereon which is supported by and axially advanced by and with the mandrel and with the overlying, laterally aligned edges at one marginal edge of one convolution of the two strips overlapping the overlying, laterally aligned edges at the opposite marginal edge of the preceding convolution whereby to form a helical seam around said tube between axially successive convolutions of the two superimposed strips which comprises four radially stacked edge portions of the two strips alternately interleaved, then progressively compressing said four radially stacked edges between said mandrel and an axially fixed seam welding wheel arranged tangentially to the mandrel with its axis inclined to the axis of rotation of the mandrel it substantially the same oblique angle as the guide means so as to track said helical seam as the tube and mandrel rotate and advance axially together and conducting a welding current through said four radially stacked edges between said seam welding wheel and said mandrel to fuse all four of said radially stacked edges together along the helical seam of the tubular element.

2. The method called for in claim 1 wherein the strip of mesh screen is arranged to overlie said strip of perforated reinforcement so that the perforated reinforcement forms the core of said tubular element and the screen forms the outer surface of the tubular element.

* * * * *